United States Patent
Li (10) Patent No.: US 6,983,284 B2
(45) Date of Patent: Jan. 3, 2006

(54) METHOD TO REDUCE INPUT PARAMETER INTERFACE ERROR AND INCONSISTENCY FOR SERVLETS

(75) Inventor: Jin Li, Toronto (CA)

(73) Assignee: International Business Machines Corporation, Armonk, NY (US)

(*) Notice: Subject to any disclaimer, the term of this patent is extended or adjusted under 35 U.S.C. 154(b) by 455 days.

(21) Appl. No.: 10/104,527

(22) Filed: Mar. 22, 2002

(65) Prior Publication Data

US 2002/0178175 A1    Nov. 28, 2002

(30) Foreign Application Priority Data

Apr. 3, 2001    (CA) .................................. 2343491

(51) Int. Cl.
*G06F 17/30*    (2006.01)

(52) U.S. Cl. .................. 707/102; 707/10; 715/762; 715/513

(58) Field of Classification Search .............. 707/1–10, 707/100–104.1, 200–206; 715/513, 781, 715/762; 717/115; 345/700
See application file for complete search history.

(56) References Cited

U.S. PATENT DOCUMENTS

| | | | |
|---|---|---|---|
| 6,578,192 B1 * | 6/2003 | Boehme et al. | 717/115 |
| 6,643,652 B2 * | 11/2003 | Helgeson et al. | 707/10 |
| 2003/0182626 A1 * | 9/2003 | Davidov et al. | 715/513 |

* cited by examiner

*Primary Examiner*—Mohammad Ali
(74) *Attorney, Agent, or Firm*—A. Bruce Clay; Hoffman, Warnick & D'Alessandro LLC (57) ABSTRACT

A GUI utility tool running on a web application development environment is presented that acts to eliminate inconsistency between a given HTML user input form description file and a corresponding servlet program file. The tool allows the user to specify an HTML file. The tool may then parse the HTML file to discover input parameters and generate Java servlet program code to receive the input parameters.

1 Claim, 6 Drawing Sheets

METHOD TO REDUCE INPUT PARAMETER INTERFACE ERROR AND INCONSISTENCY FOR SERVLETS

FIELD OF THE INVENTION

The present invention relates to generation of servlet programs that correspond to user input forms and, more particularly, to reducing input parameter interface error.

BACKGROUND OF THE INVENTION

Although the Internet and, more specifically, the world wide web (or just "the web") is a very useful tool for distributing information, the web may be used as an information gathering tool as well. A typical server-side information gathering session involves a web server and an application server. In a representative information gathering session, a Hyper-Text Markup Language (HTML) form is served by the web server to gather user input. Once received by a web server, the user input may be submitted to a common gateway interface (CGI) script or a servlet program running on the application server. In the case where a servlet program receives the input, the servlet program must parse the input into input parameters and extract the value of each input parameter.

For example, an input parameter named "employeeID" is defined in the following HTML code and a portion of Java code (from a corresponding servlet program) is provided to use the input parameter.

```
myInput.html
<HTML>
<BODY>
<FORM METHOD="post" ACTION="/servlet/myServlet">
<INPUT TYPE="text" NAME="employeeID" ID="employeeID"
SIZE="8" MAXLENGTH="8">
<INPUT TYPE="password" NAME="password" SIZE="8"
MAXLENGTH="8">
<INPUT TYPE="submit" NAME="Submit" ID="Submit"
VALUE="Submit">
</FORM>
</BODY>
</HTML>
myServlet.java
public void doPost(javax.servlet.http.HttpServletRequest request,
javax.servlet.http.HttpServletResponse response)
    throws servletException, IOException
{
    String argEmployeeID = request.getParameter("employeeID");
    String argPassword = request.getParameter("password");
    // more code after this
}
```

It is known that the name of the input parameter must be the same in both the HTML code and the Java code. Taken together, multiple input parameters serve as an interface (called an "input parameter interface" herein) between an HTML input file and a corresponding servlet program file. If any changes are to be made, both files need to be updated and, it is then hoped that both the HTML input file and the servlet program are free of spelling errors, etc. Furthermore, it is typical for one person, a web developer, to develop the HTML file, and another person, a Java coder, to develop the servlet program. This separation of development roles can lead to synchronization and consistency problems.

SUMMARY OF THE INVENTION

A utility development tool is proposed to solve synchronization and consistency problems between HTML files and corresponding servlet programs. A servlet program developer may use this utility development tool to automatically parse the input parameters from an HTML file. The servlet developer may then select input parameters of interest for the servlet program and, thereby, allow the tool to automatically generate appropriate servlet program code for retrieving the input parameter value from the selected input parameters. In addition, this tool can use timestamps on the HTML and servlet program files to generate notifications instructing the servlet developer to synchronize the input parameter interface.

In accordance with an aspect of the present invention there is provided a method of generating servlet program code, to reduce input parameter interface error, including receiving a form description file, automatically parsing the form description file to discover input parameters and automatically generating the servlet program code to receive the input parameters. In a further aspect of the present invention, there is provided a software medium that permits a general purpose computer to carry out this method.

In accordance with another aspect of the present invention there is provided a method of synchronizing files including determining a first value for a time stamp on a form description file, determining a second value for a time stamp on a servlet program file, comparing the first value to the second value and, if the comparing indicates that the form description file was edited more recently than the servlet program file, generating an alarm. In a further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
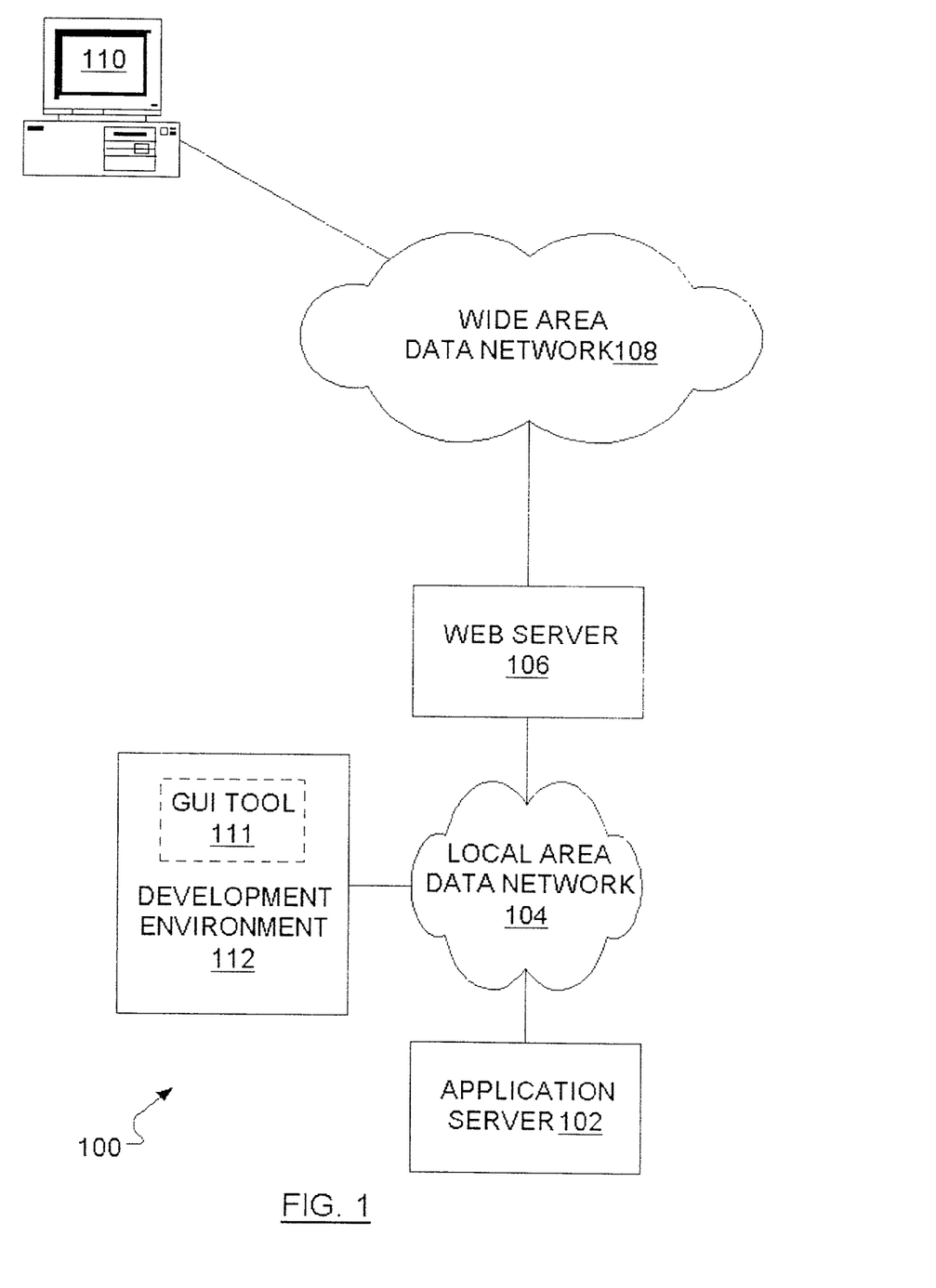
FIG. 1 illustrates a communications network for use with an embodiment of the present invention.

FIG. 1 illustrates a communications network 100 including an application server 102, a web server 106 and a development environment 112 all connected to a local area data network 104. The web server 106 is also connected to a wide area data network that is connected to a personal computer 110. The development environment 112 may be, for instance, VisualAge™ for Java™ marketed by IBM Corporation of Armonk, N.Y., and may be used for producing both web pages to be served from the web server 106 and servlet program files that run on the application server 102.

In overview, a graphical user interface (GUI) utility tool 111, running on the development environment 112, automatically parses an HTML file, which is to be served, for instance, to the personal computer 110 by the web server 106, for input parameters. The GUI utility tool 111 then generates servlet program code to receive the parsed input parameters. The servlet program code is subsequently executed on the application server 102. Generation of servlet program code in this way acts to eliminate errors in the manual coding process and guarantee input parameter interface consistency between the HTML files and corresponding servlet program files. The use of a timestamp on files, to produce user notifications to re-generate the servlet program code in the servlet, minimizes the chance that the HTML files and corresponding servlet program files become unsynchronized.

Figure 2:
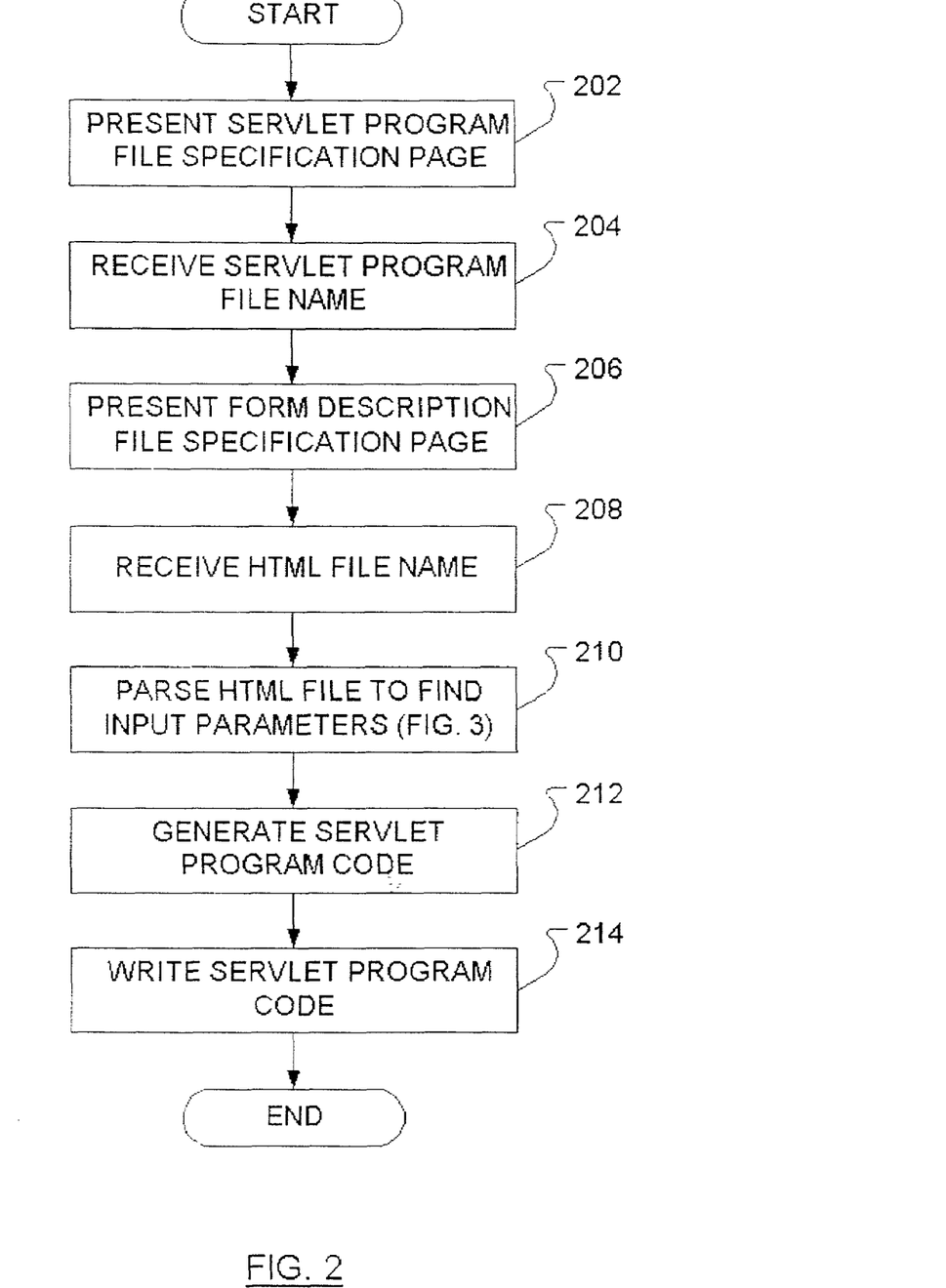
FIG. 2 illustrates, in a flow diagram, method steps followed by a graphical user interface (GUI) utility tool during a servlet program file generation session in an embodiment of the invention.
Figure 4:
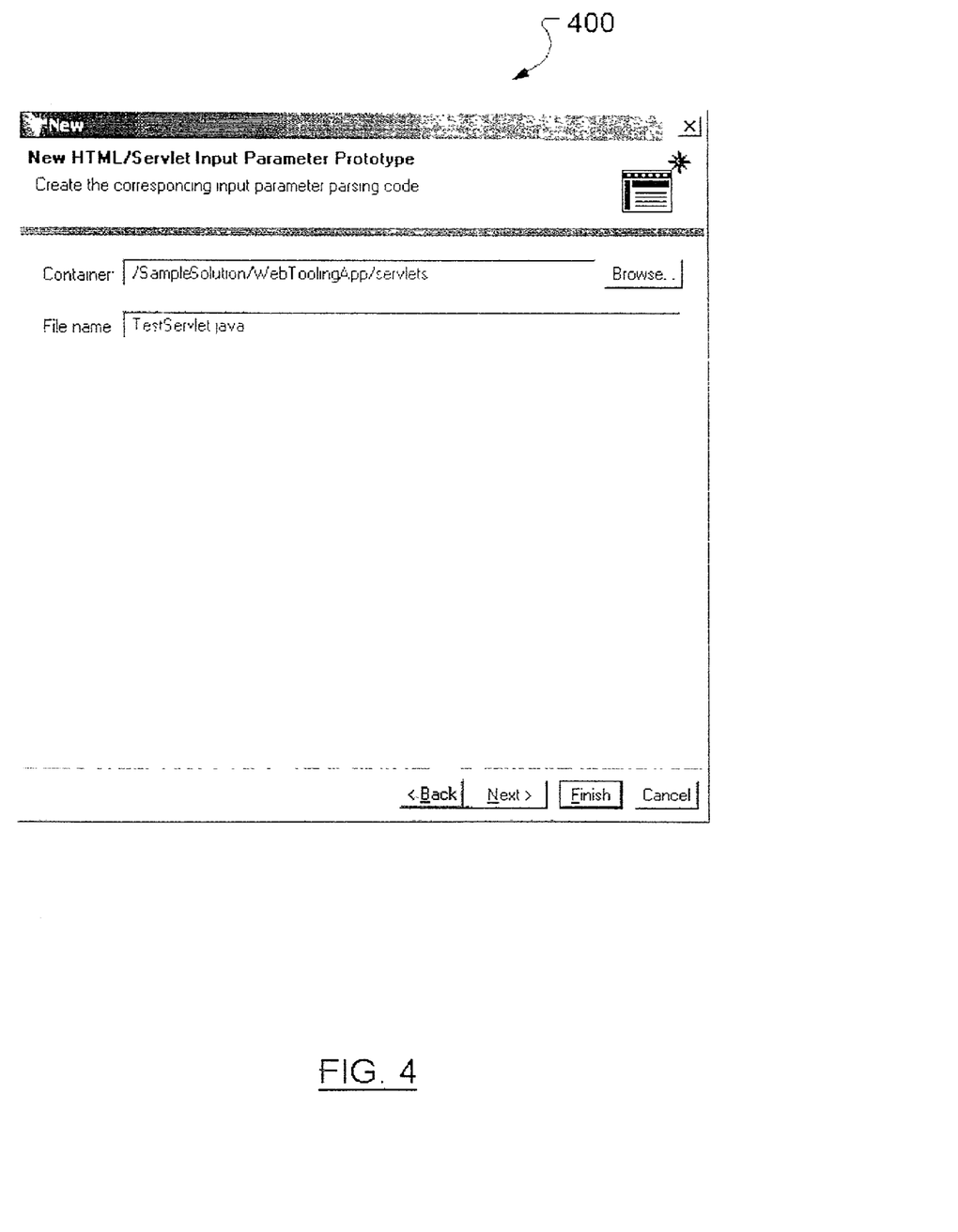
FIG. 4 illustrates an exemplary servlet program file specification page presented in an embodiment of the present invention.
Figure 5:
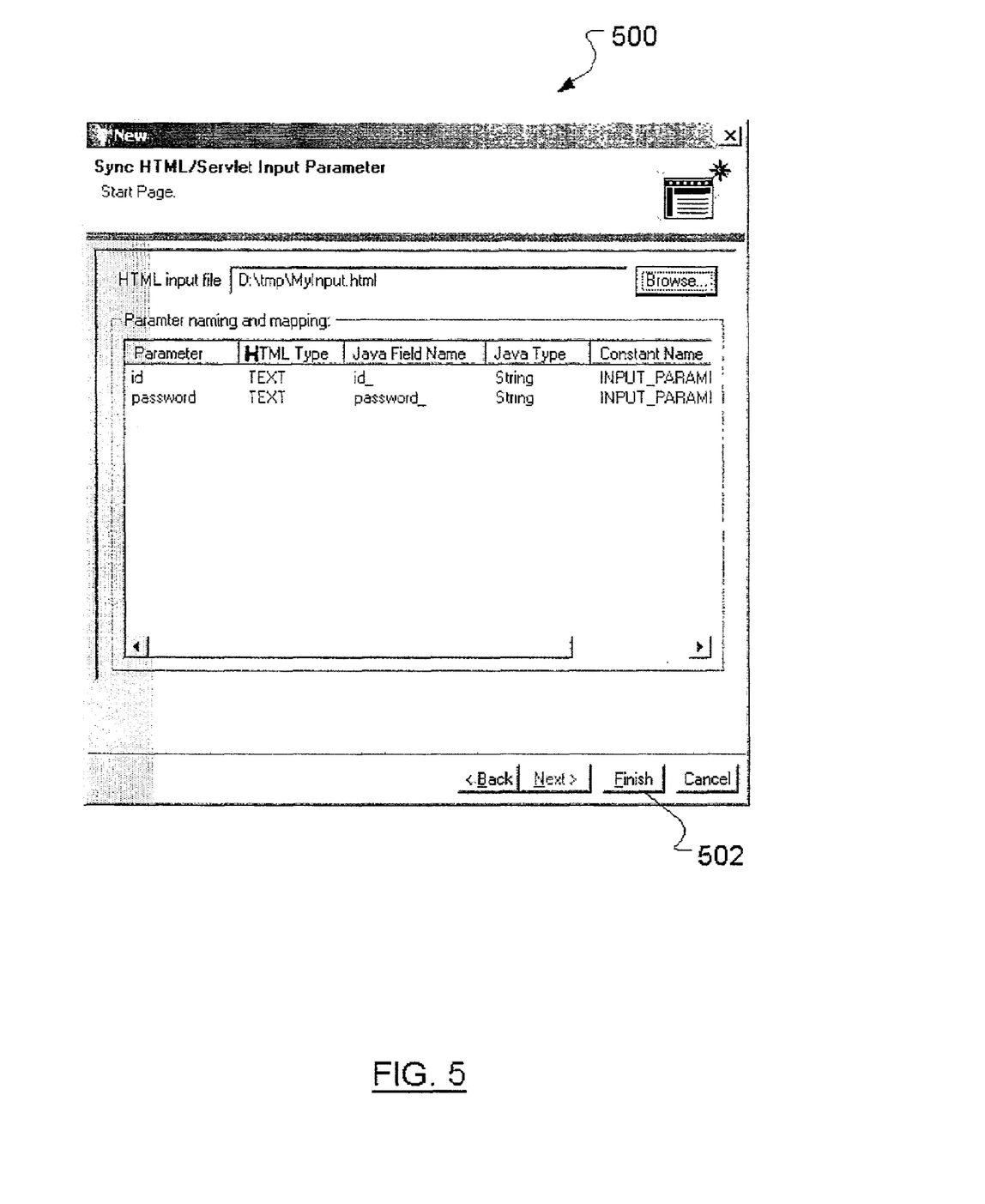
FIG. 5 illustrates an exemplary form description file specification page presented in an embodiment of the present invention.

In operation, the GUI utility tool 111 is run on the development environment 112 by a user of the development environment 112. Steps of a servlet program file generation method are illustrated in FIG. 2. The GUI utility tool 111 initially presents a servlet program file specification page to the user (step 202). An example of such a page is illustrated in FIG. 4 as servlet program file specification page 400. A servlet program file name is then received from the user by the GUI utility tool 111 (step 204). The servlet program file specified by the user may be an existing file or a file that is to be generated by the GUI utility tool 111. The GUI utility tool 111 then presents an HTML file specification page to the user (step 206). An example of such a page is illustrated in FIG. 5 as a form description file specification page 500. An HTML file name is then received from the user by the GUI utility tool 111 (step 208). The GUI utility tool 111 then parses the HTML file specified by the user to identify input parameters (step 210). A detailed examination of the steps involved in parsing the HTML file is described hereinafter in conjunction with FIG. 3. In response to a signal received from the user, for instance, the pushing of a "Finish" button 502 on the form description file specification page 500, the input parameters that were parsed in step 210 are used to generate a servlet program file (step 212). The generated servlet program file is then written (step 214) to a file with the name received in step 204.

Figure 3:
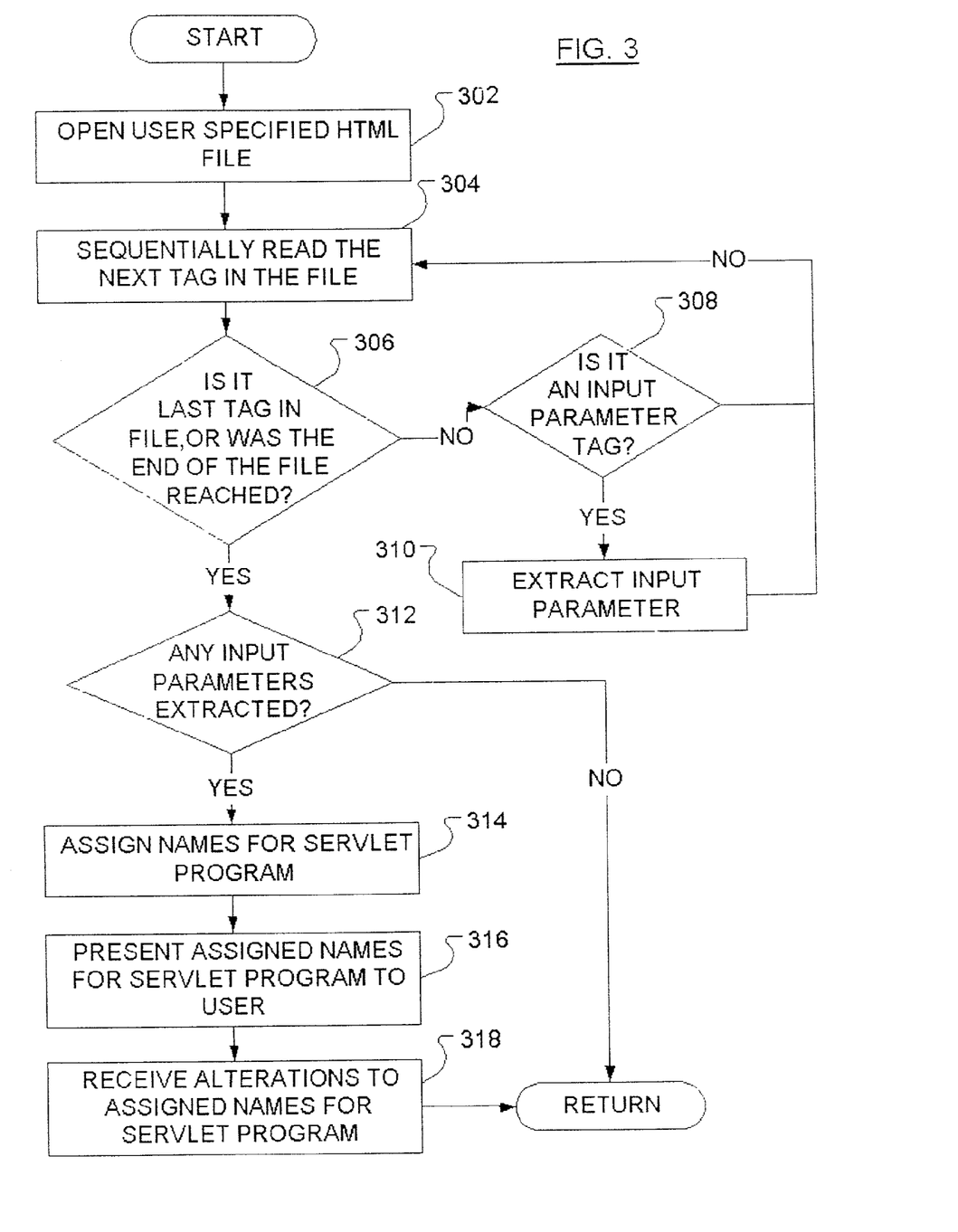
FIG. 3 illustrates, in a flow diagram, method steps followed by the GUI utility tool while parsing a form description file in an embodiment of the invention.

FIG. 3 illustrates the sub-steps which are involved in step 210. The GUI utility tool 111 begins parsing the HTML file, as illustrated in FIG. 3, by opening the HTML file (step 302) that was specified in step 208 (FIG. 2). Each tag in the HTML file is read sequentially (step 304). If the tag in question is not the last tag in the HTML file, it is determined whether the tag identifies an input parameter (step 308). A tag that identifies an input parameter may, for instance, read as follows:

<INPUT TYPE="text" NAME="Employee ID:"
ID="employeeID" SIZE="8">

If the tag in question identifies an input parameter, the name of the input parameter (employeeID in the above example) is extracted (step 310) and the next tag is read (step 304). However, if the tag in question does not identify an input parameter, no action is taken in relation to the tag and the next tag is read (step 304). If the tag in question is the last tag in the file, likely recognised as "</html>", or the end of the file is reached (step 306), it is then determined whether any input parameters have been extracted (step 312). If input parameters have been extracted, the input parameter names are used to assign names for use in servlet program code (servlet program field name, servlet program constant name) (step 314) and these names are presented to the user (step 316). This presentation to the user allows the user to alter the names if desired. These alterations, if any, are received (step 318) before the parsing operation s considered complete. Once parsing is considered complete, the GUI utility tool 111 generates the servlet program code (step 212, FIG. 2).

As shown in the form description file specification page 500 (FIG. 5), two input parameters, namely "id" and "password", have been parsed from the specified HTML file (MyInput.html). A servlet program field name (e.g., id_, password_) has been automatically chosen by the GUI utility tool 111, corresponding to each input parameter. A servlet program constant name has also been assigned, by the GUI utility tool 111, to each servlet program field name. Although names for the servlet program fields and constants are initially assigned by the GUI utility tool 111, the structure of the form description file specification page 500 may be arranged, as shown in FIG. 5, to allow the user to modify the naming.

After generation of the servlet code to capture input parameters, a user may generate code to operate upon, or otherwise analyze, the parameter values. This may not be necessary if the servlet code to capture input parameters is merely being regenerated to synchronize with an HTML file that has changed. However, in the regeneration case, the remainder of the servlet code should be changed to reflect changes in the input parameters capturing servlet code.

As the generated servlet program file is saved in step 214, a time stamp may be included, indicating, for instance, a date and time at which a servlet program file was generated. Similarly, whatever tool is used to make amendments to the HTML file may include a time stamp indicating a date and time at which the HTML file was amended. A secondary application, or a function of the GUI utility tool 111, may be devised to allow a user to maintain synchronization between a servlet program file and a corresponding HTML file.

Figure 6:
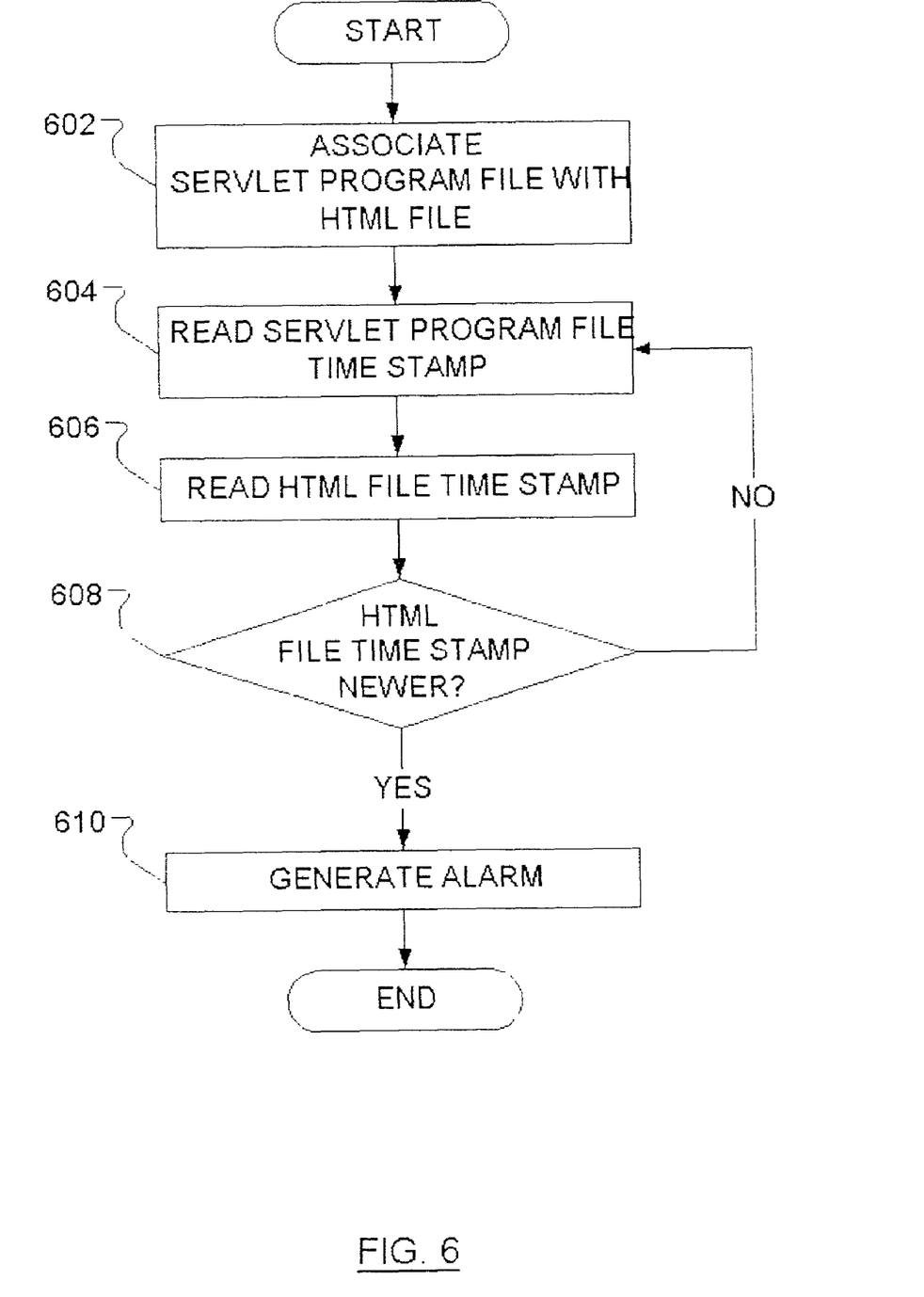
FIG. 6 illustrates, in a flow diagram, method steps followed to allow a user to maintain synchronization between a servlet program file and a form description file in an embodiment of the invention.

FIG. 6 illustrates steps of a method that allows a user to maintain synchronization. Initially, a given servlet program file is associated with a corresponding HTML file (step 602), i.e., the HTML file from which the given servlet program file was (in part) generated. Monitoring the time stamps requires that this synchronization maintenance application read the given servlet program file time stamp (step 604) and the time stamp of the corresponding HTML file (step 606). The time stamps may then be compared (step 608). If the time stamp on the HTML file is more recent than the time stamp of the given servlet program file, an alarm may be generated (step 610). This alarm suggests to the user that the given servlet program file, for which the alarm is raised, may not be synchronized with the corresponding HTML file.

Thus far described, the invention relies on input from a user of the development environment 112 (FIG. 1) via a GUI. However, the utility tool 111 may be arranged to act on an input file that lists a servlet program file name (for a new or existing servlet program file) and an HTML file name (for an existing HTML file).

As will be apparent to a person skilled in the art, one suitable language for the servlet program code is Java.

Furthermore, the language used for the form description files may be other than HTML, such as the Extensible Markup Language (XML).

Other modifications will be apparent to those skilled in the art and, therefore, the invention is defined in the claims.

The embodiments of the invention in which an exclusive property or privilege is claimed are defined as follows:

1. A method of generating servlet program code, to reduce input parameter interface error, composing:
   presenting to a user from a GUI utility tool a servlet program file specification page, wherein the GUI utility tool is run on a development environment by the user;
   presenting to the user by the GUI utility tool a servlet program file name, wherein the servlet program file may be an existing file or a file that is to be generated by the GUI utility tool;
   presenting to the user by the GUI utility tool an HTML file specification page;
   presenting to the user by the GUI utility tool an HTML file name;
   parsing an HTML file specified by the user to identify input parameters, wherein the parsing step further includes:
     opening the HTML file specified by the user;
     reading sequentially each tag in the HTML file;
     determining for each read tag whether the tag identifies an input parameter;
     in response to the determining step, if the tag identifies an input parameter, extracting a name of the input parameter;
     if at least one of the tag is a last tag in the HTML file and the end of the HTML file is reached, determining whether any input parameters have been extracted and, if so, using names of the input parameters to assign names for use in servlet program code;
     presenting the assigned names to the user; and
     allowing the user to alter the assigned names;
   generating, in response to a signal received from the user a servlet program file using the input parameters from the parsing step; and
   writing the generated servlet program file with a time stamp to a file corresponding to the servlet program file name, wherein the GUI utility tool uses the time stamp to maintain synchronization between the servlet program file and the HTML file by comparing the time stamp of the file corresponding to the servlet program file name with a time stamp of the HTML file and generating an alarm if the time stamp of the HTML file is more recent than the time stamp of the file corresponding to the servlet program file name.

* * * * *

UNITED STATES PATENT AND TRADEMARK OFFICE
CERTIFICATE OF CORRECTION

PATENT NO. : 6,983,284 B2
DATED : January 3, 2006
INVENTOR(S) : Jin Li

It is certified that error appears in the above-identified patent and that said Letters Patent is hereby corrected as shown below:

Column 5,
Line 14, delete "composing" and insert -- comprising --.

Signed and Sealed this

Twenty-eighth Day of March, 2006

JON W. DUDAS
*Director of the United States Patent and Trademark Office*